(12) United States Patent
Sukigara

(10) Patent No.: US 7,114,067 B2
(45) Date of Patent: *Sep. 26, 2006

(54) METHOD OF EFFICIENTLY DETECTING WHETHER A DEVICE IS CONNECTED TO AN INFORMATION PROCESSING SYSTEM BY DETECTING SHORT CIRCUITS TO PREDETERMINED SIGNAL LINES OF AN IDE INTERFACE

(75) Inventor: Motoyuki Sukigara, Suginami-ku (JP)

(73) Assignee: TEAC Corporation, Musashino (JP)

( * ) Notice: Subject to any disclaimer, the term of this patent is extended or adjusted under 35 U.S.C. 154(b) by 338 days.

This patent is subject to a terminal disclaimer.

(21) Appl. No.: 10/152,315

(22) Filed: May 22, 2002

(65) Prior Publication Data
US 2004/0230701 A1    Nov. 18, 2004

(30) Foreign Application Priority Data
Jun. 8, 2001  (JP)  ............... 2001-173597

(51) Int. Cl.
  *G06F 9/00*  (2006.01)
(52) U.S. Cl. ............ 713/2; 713/2; 726/9; 710/10
(58) Field of Classification Search .......... 713/2; 726/9; 710/10; 709/253
See application file for complete search history.

(56) References Cited

U.S. PATENT DOCUMENTS

| | | | | |
|---|---|---|---|---|
| 5,210,875 A | * | 5/1993 | Bealkowski et al. | 713/2 |
| 5,911,042 A | * | 6/1999 | Kugue | 726/19 |
| 6,092,135 A | * | 7/2000 | Kwon | 710/104 |
| 6,401,140 B1 | * | 6/2002 | Wu | 710/10 |
| 6,434,697 B1 | * | 8/2002 | Leyda et al. | 713/2 |
| 6,523,112 B1 | * | 2/2003 | Gallagher et al. | 713/2 |
| 2002/0095437 A1 | * | 7/2002 | Sugiyama | 707/204 |
| 2004/0230702 A1 | * | 11/2004 | Sukigara | 709/253 |

FOREIGN PATENT DOCUMENTS

| | | |
|---|---|---|
| JP | 10177536 A | 6/1998 |
| JP | 2000259546 A | 9/2000 |

* cited by examiner

Primary Examiner—Thomas Lee
Assistant Examiner—Sean Weinman
(74) Attorney, Agent, or Firm—Christensen O'Connor Johnson Kindness PLLC

(57) ABSTRACT

A strap pin short-circuits specific signal lines on an unused interface an IDE interface with which a hard disk is connected. When the server device starts, a BIOS skips the process for recognizing the IDE interface when specific lines of an IDE interface are short-circuited.

6 Claims, 4 Drawing Sheets

FIG.2(a) FRONT VIEW
FIG.2(b) REAR VIEW
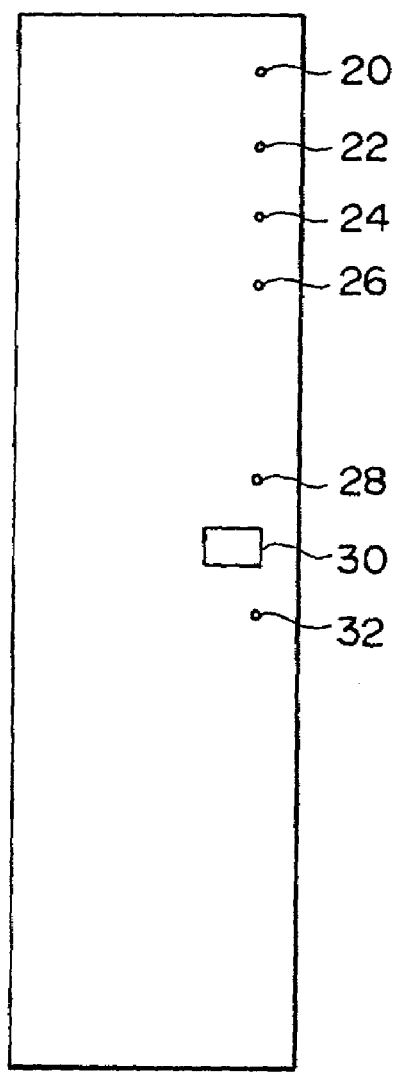
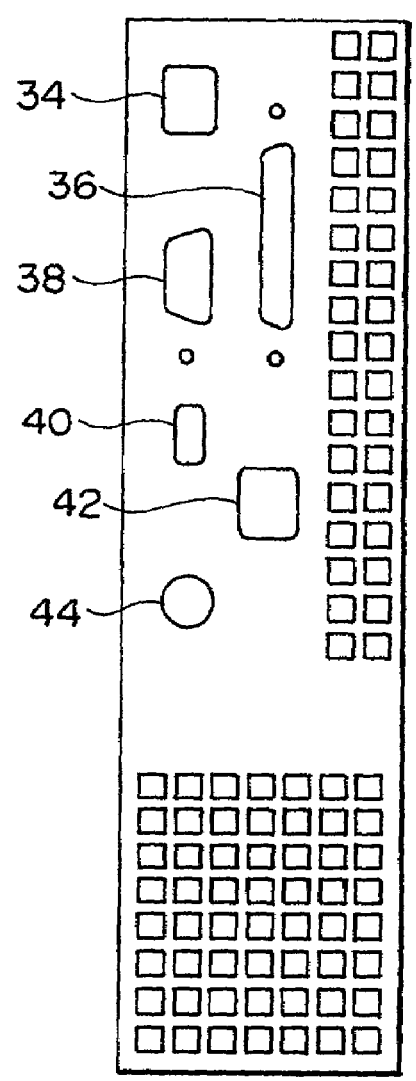

METHOD OF EFFICIENTLY DETECTING WHETHER A DEVICE IS CONNECTED TO AN INFORMATION PROCESSING SYSTEM BY DETECTING SHORT CIRCUITS TO PREDETERMINED SIGNAL LINES OF AN IDE INTERFACE

TECHNICAL FIELD

The present invention relates to an information processing device, and specifically to a hardware recognition process using a BIOS (Basic Input/Output System).

BACKGROUND OF THE INVENTION

It is widely known that most personal computers are provided with a BIOS, and the BIOS initializes different types of connected devices on a computer boot-up and establishes different types of settings for them, while providing an OS and an application with a program interface (API) for a relatively easy access to system hardware.

For example, a startup screen of a BIOS on a motherboard is shown, and displays the recognition result of an installed CPU, memory capacity, and a recognition result of all connected IDE hard disks upon the start-up of a PC/AT compatible machine. When a NIC (Network Interface Card) and a SCSI (Small Computer System Interface) card are connected, BIOSs installed on these cards initiate and the results for them are shown. When the process of BIOS ends, the OS is read in from a hard disk, a floppy drive, or a CD-ROM drive to start.

When a specific key (such as DEL key) is pressed while the startup screen of BIOS is present, the display switches to a BIOS setting menu screen, and different types of settings are available. There is a setting item for hard disk drives connected with an IDE interface, as one of the setting items on the BIOS setting menu screen. This setting item is provided for setting whether a hard disk drive is connected, respectively, with a master primary IDE, a slave primary IDE, a master secondary IDE, and/or a slave secondary IDE.

While it usually takes about one to five seconds for the recognition process for a hard disk drive connected to the IDE interface, if the BIOS is set such that a hard disk drive is connected, while a hard disk drive is not actually connected, it takes about 20 seconds for the BIOS to detect that the hard disk drive is not connected. Thus, it is effective to set the setting item related to the hard disk drive is set such that a hard disk drive is not connected, thus eliminating this wait time.

A server without a removable storage device, such as a CD-ROM drive, floppy disk drive, a video output, or a keyboard has recently been proposed for system management through a network, from a client PC on a network, such as a LAN or the Internet. The base of this server is still often a general PC/AT compatible machine.

It is impossible to show a BIOS setting screen and to change the setting, as described above, on this server that does not include a display or a keyboard. As a result, it is impossible to set it such that a hard disk drive is not connected, and thus, there is a problem wherein the wait time caused by the recognition process for the hard disk drive is present. Because a user potentially adds a hard disk, it is necessary to always monitor the existence of a hard disk on the IDE interface.

SUMMARY OF THE INVENTION

The present invention is devised in view of the problems of prior art, and its purpose is to provide a device that shortens the process and/or reduces the processes for recognizing devices connected with an IDE interface, and reduces the processing time required for startup.

To attain the purpose described above, the present invention provides an information processing device, comprising a ROM for storing a program, a processing unit, an IDE interface, a bus for connecting the ROM, the processing unit, and the IDE interface with one another, where the processing unit reads out and executes the program before the information processing device starts up, detects whether specific signal lines are short-circuited with each other on the IDE interface, and skips a process for checking whether a device is connected with the IDE interface when they are short-circuited.

The specific signal lines may be unassigned lines. The IDE interface may be the secondary interface. The specific signal lines are short-circuited on the IDE interface, and the processing unit executes the program (BIOS) to detect that a device is not connected to the IDE interface, and skips the recognition process in the present invention. Because an user simply opens a casing for the information processing device, and uses a strap pin, or the like, to short-circuit the specific signals on the IDE interface, it is easy to reduce the processing time for IDE interface. The present invention is applied to the embodiment where a hard disk is connected with the primary port of IDE interface and a hard disk is not connected with the secondary port. In this case, the recognition process for secondary port is automatically skipped, and the startup time for information processing device is reduced by a corresponding time.

As described above, the present invention allows the elimination of processes for recognizing an IDE interface, without the use of a keyboard, or the like, thus reducing processing time. Moreover, the present invention permits the establishing of settings for a BIOS to be changed without using a keyboard, while reducing the processing time for a server device.

BRIEF DESCRIPTION OF THE DRAWINGS

FIG. 2 illustrates a front view and a rear view of a server device of the present invention.

DETAILED DESCRIPTION OF THE PREFERRED EMBODIMENTS

The following section describes an embodiment of the present invention based on drawings while exemplifying a server device as an information processing device.

Figure 1:
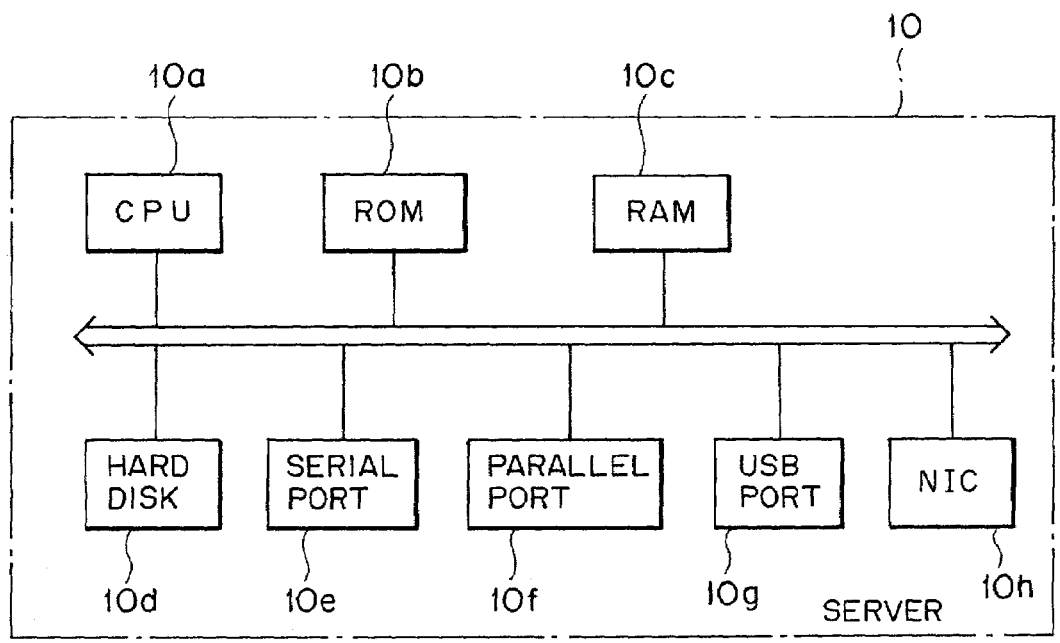
FIG. 1 illustrates a diagram for a server device relating to an embodiment of the present invention.

FIG. 1 shows a block diagram of the server device (or a server computer) relating to the present embodiment.

The server device 10 comprising a CPU 10a, a ROM 10b where a BIOS program and the like are stored, a RAM 10c, a hard disk 10d, a serial port 10e, a parallel port 10f, an USB port 10g, and a NIC 10h. Though this is almost similar to a general computer, there are no keyboards, interfaces for a mouse or video, or a CD-ROM drive (or a DVD drive), and consequently there are no keyboards, mouses, or displays are connected. Because there are no keyboards, or displays, a network administrator does not utilize a keyboard to specify IP addresses and other settings, as for a conventional server device, and all settings are conducted through a client device (a client computer) connected to a network.

Linux, for example, is installed on the hard disk as an OS (Operating System), to start as a WWW server, and a CGI (Common Gateway Interface) is used for setting conditions from the client device.

FIG. 2 shows the exterior of the server device 10 shown in FIG. 1. (a) is a front view and (b) is a rear view. A hard disk LED 20, a LAN LED 22, a status LED 24, an extended LAN LED 26, a power LED 28, a power switch 30, and a reset switch 32 are provided on a front face, and a LAN connector 34, a printer port 36, a serial port 38, an USB port 40, an extended LAN connector 42, and a power supply receptacle 44 are provided on a rear face. A LAN cable, such as a 10 BASE-T is connected between the LAN connector 34 and a hub physically establishes a connection with a network. Note that there is no port or connector for connecting with a keyboard, a mouse or a display, as shown in the rear view.

Figure 3:
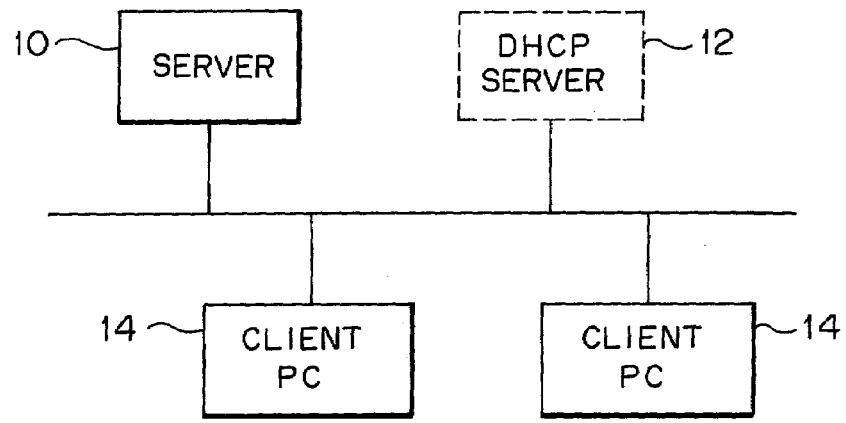
FIG. 3 illustrates a diagram of an embodiment of the present invention.

FIG. 3 shows a schematic network of a present embodiment. The server device 10 and client devices (client PC's) 14 are connected to the same network. When the server device 10 and the client devices 14 are connected through a hub, they are connected using a so-called star-type connection, needless to say. When the server device 10 and the client devices 14 use TCP/IP protocol to communicate with each other, it is necessary to assign IP addresses to identify the individual computers. When there exists a DHCP server 12 on the network, the DHCP 12 server usually assigns devices connected with the network IP addresses dynamically. Namely, a set of IP addresses is reserved on the DHCP server for clients, an IP addresses are sequentially assigned upon the start-up of the client device, and the assigned IP address is recovered on a stop of the client device.

When the DHCP server 12 does not exist on the network, a network administrator, who has specialized knowledge, has to manually assign the individual device(s) IP addresses, and it is relatively difficult to correctly assign IP addresses without redundancy.

Even when the DHCP server 12 does not exist on the network, the client device 14 is used to simply assign to the server device 10 an IP address. Specifically, software installed on the client device 14 starts to detect the existence of server device 10 based on a MAC address, and ping command searches for a free IP address, while sequentially changing an IP address. When a free IP address is found, the IP address is assigned as an IP address for the server device 10. Then, the WWW browser on the client device 14 is executed to set a name for the server device 10 and a permission for accessing.

In this way, though the server device 10 of a present embodiment is connected with a network, and serves as a file server without a keyboard or a display. Because a user cannot change the settings of BIOS through a keyboard, the process of BIOS may take a relatively significant amount of time. For example, when a hard disk is only connected to a primary port of an IDE interface and not to a secondary port of an IDE interface, though it is possible to change the BIOS setting to disable the secondary IDE interface to reduce the processing time, this setting is not available on the server device 10 of a present embodiment.

In an embodiment of the present invention, a strap pin is simply connected to the IDE interface to reduce the processing time for BIOS instead of using a keyboard, or the like, to change the setting of the BIOS.

Figure 4:
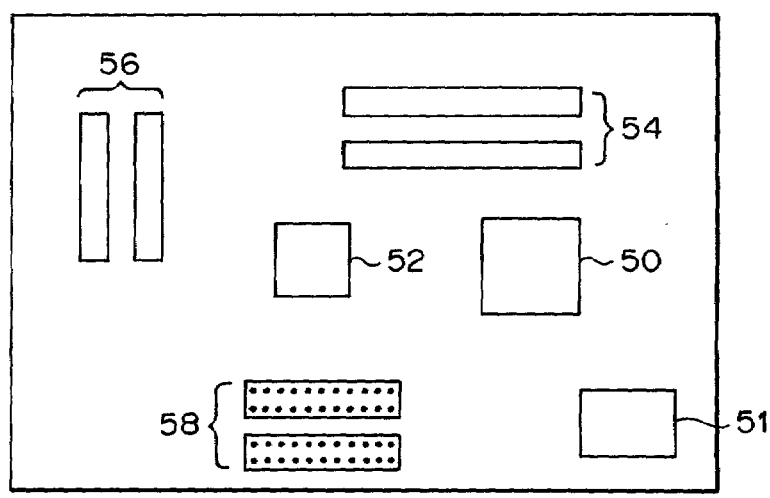
FIG. 4 illustrates a motherboard of a server device of the present invention.

FIG. 4 shows a layout of a motherboard of the server device 10. The motherboard includes, a CPU socket 50, a BIOS ROM 51, a chip set 52, a memory socket 54, a PCI bus 56, and an IDE interface (an enhanced IDE interface) 58 as a general PC. The hard disk is connected with the IDE interface 58. The IDE interface 58 includes, the primary side (the primary port) and the secondary side (the secondary port), and these individual ports, respectively, include, two connectors (a master and a slave). When a user connects a hard disk to only the primary port, and does not connect the hard disk to the secondary port, the user inserts a strap pin onto specific pins on the secondary port to short-circuit the pins.

Figure 5:
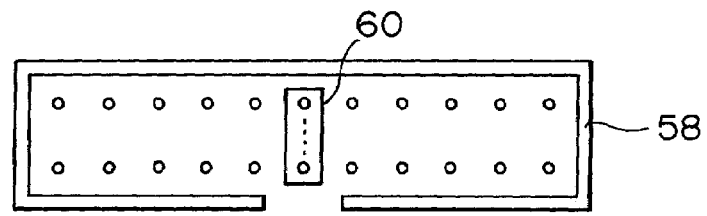
FIG. 5 illustrates an IDE interface of the present invention.

FIG. 5 shows the secondary IDE interface 58. Multiple pins are formed on the IDE interface 58, and pins centrally located are dummy pins, which do not send or receive an actual signal, and specify the direction of a cable for connecting a hard disk. A strap pin 60 is inserted on these dummy pins to short-circuit corresponding signal lines in an embodiment of the present invention. A dashed line in drawing shows the short circuit state. The BIOS detects the short circuit of signal lines in order to recognize that the corresponding IDE interface is not in use.

Figure 6:
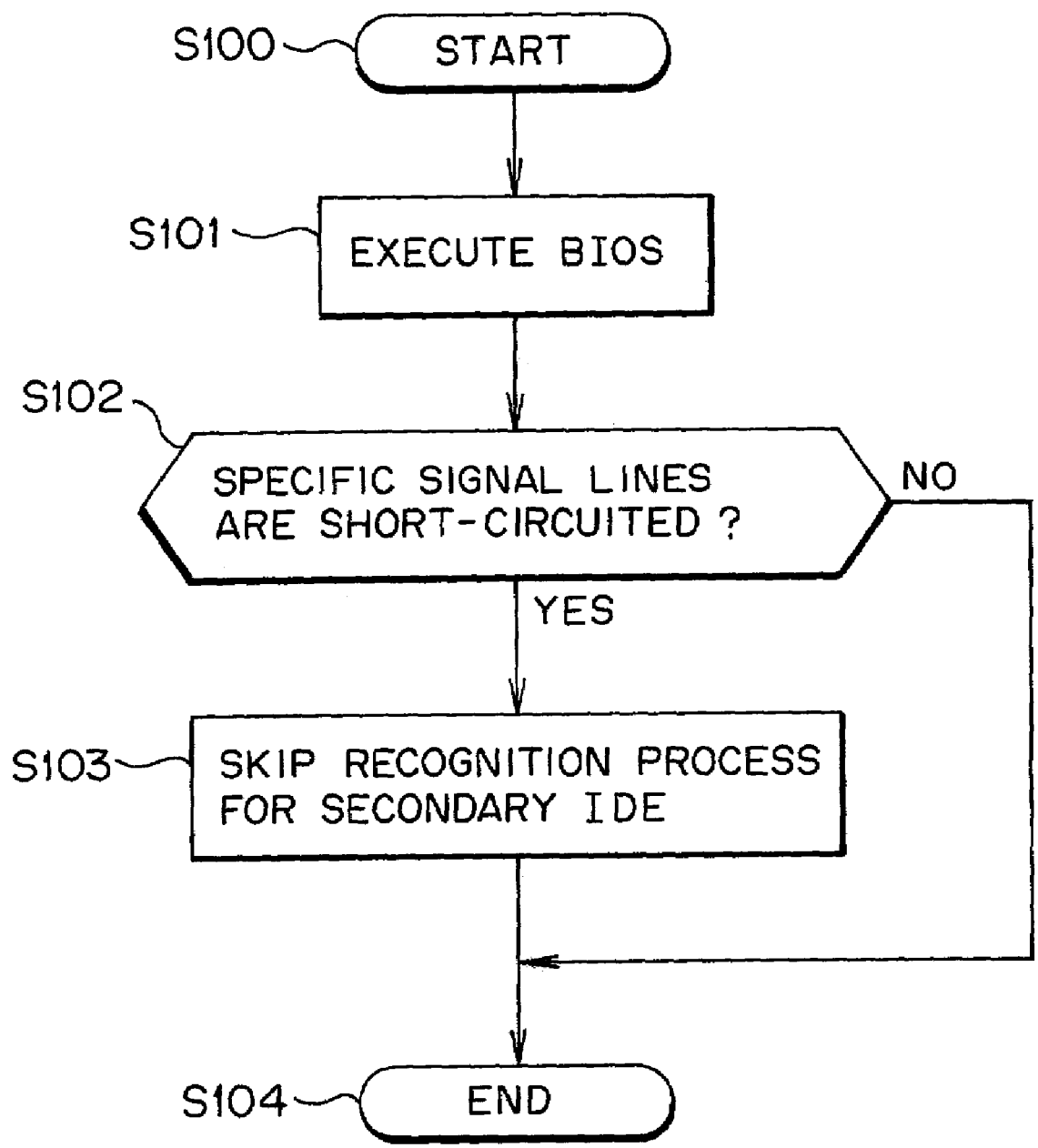
FIG. 6 illustrates a flowchart for a BIOS process of an embodiment of the present invention.

FIG. 6 shows a process flowchart for the BIOS. When the server 10 starts (S100), the BIOS is executed, and a process for recognizing hardware is conducted (S101). Specifically, the memory, the hard disk, and the PCI bus (the SCSI and the NIC) are recognized in this order, and the state of signal lines on the IDE interface 58, namely the existence of short circuit, is detected (S102). When they are short-circuited, it is determined that a hard disk is not connected with the secondary IDE interface, and the recognition process for a secondary port is skipped (S103). This process of recognizing the hard disk takes the longest time in the hardware recognition process for the BIOS, and skipping the recognition process for a secondary port reduces the time by about a several dozens of seconds. Thereafter, the recognition process for other hardware continues in the same manner as before the OS starts, but prior to ending of the hardware recognition process, including the end of the BIOS operation (S104), and a data transmission to and reception from the client device 14 becomes possible.

In this way, simply inserting the strap pin actually changes the setting of BIOS, while reducing the processing time in a present embodiment.

While the strap pin is used in a present embodiment, other means may be used to short-circuit the specific signal lines, and pins other than the dummy pins may be short-circuited.

A user can connect a hard disk to the secondary IDE interface after removing the strap pin 60. In this case, because specific signal lines are not short-circuited, the BIOS conducts the normal recognition process instead of skipping it.

Those skilled in the art will recognize that the method and apparatus of the present invention has many applications, and that the present invention is not limited to the representative examples disclosed herein. Although illustrative, the embodiments disclosed herein have a wide range of modification, change and substitution that is intended and in some instances some features of the present invention may be employed without a corresponding use of the other features.

Moreover, the scope of the present invention covers conventionally known variations and modifications to the system components described herein, as would be known by those skilled in the art. Accordingly, it is appropriate that the appended claims be construed broadly and in a manner consistent with the scope of the invention.

What is claimed is:

1. An information processing device comprising:
   a ROM for storing a program;
   a processing unit;
   an IDE interface; and
   a bus for connecting said ROM, said processing unit, and said IDE interface with one another,
   wherein said processing unit, at the time when said information processing device is starting up, reads and executes said program to detect whether or not predetermined signal lines of said IDE interface are short-circuited, and, if said predetermined signal lines are detected to be short-circuited, to skip a process for confirming whether a device is connected to said IDE interface.

2. The information processing device according to claim 1, wherein said predetermined signal lines are unused lines.

3. The information processing device according to claim 1, wherein said IDE interface is a secondary interface, predetermined signal lines are short-circuited with each other.

4. A method for recognizing a device connected to an information processing device, comprising:
   providing a ROM for storing a program;
   providing a processing unit;
   providing an IDE interface; and
   providing a bus for connecting said ROM, said processing unit, and said IDE interface with one another;
   wherein said processing unit is configured to read and execute said program at the time when said information processing device is starting up to perform the steps of:
   (a) detecting whether or not predetermined signal lines of said IDE interface are short-circuited; and
   (b) if said predetermined signal lines are detected to be short-circuited, skipping a process for confirming whether a device is connected to said IDE interface.

5. The method according to claim 4, wherein said predetermined signal lines are unused lines.

6. The method according to claim 4, wherein said IDE interface is a secondary interface.

* * * * *

UNITED STATES PATENT AND TRADEMARK OFFICE
CERTIFICATE OF CORRECTION

| | |
|---|---|
| PATENT NO. | : 7,114,067 B2 |
| APPLICATION NO. | : 10/152315 |
| DATED | : September 26, 2006 |
| INVENTOR(S) | : M. Sukigara |

It is certified that error appears in the above-identified patent and that said Letters Patent is hereby corrected as shown below:

| COLUMN | LINE | ERROR |
|---|---|---|
| (57) Pg. 1, col. 2 | Abstract 1-3 of text | "A strap pin short-circuits specific signal lines on an unused interface an IDE interface with which a hard disk is connected." should read --A strap pin short-circuits specific signal lines on an unused IDE interface to which a hard disk can be connected.-- |
| 6 (Claim 3, | 1-4 lines 1-4) | delete Claim 3 in its entirety and substitute --3. The information processing device according to claim 1, wherein said IDE interface is a secondary interface.-- |

Signed and Sealed this

Twenty-seventh Day of February, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,114,067 B2 | Page 1 of 1 |
| APPLICATION NO. | : 10/152315 | |
| DATED | : September 26, 2006 | |
| INVENTOR(S) | : Motoyuki Sukigara | |

It is certified that error appears in the above-identified patent and that said Letters Patent is hereby corrected as shown below:

On the Title page, Item (*) Notice
"This patent is subject to a terminal disclaimer" should be removed Signed and Sealed this Seventh Day of December, 2010

David J. Kappos
*Director of the United States Patent and Trademark Office*